(12) United States Patent
Arndt (10) Patent No.: US 6,658,591 B1
(45) Date of Patent: Dec. 2, 2003

(54) RECOVERY FROM DATA FETCH ERRORS IN HYPERVISOR CODE

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 09/589,797

(22) Filed: Jun. 8, 2000

(51) Int. Cl.$^7$ .......................... H02H 3/05; G06F 17/00; G06F 15/00; G06F 7/38
(52) U.S. Cl. ................................ 714/6; 714/11; 709/1; 712/13; 712/228
(58) Field of Search ............................ 714/6–7, 11–13, 714/25, 48; 709/1; 712/13, 228

(56) References Cited

U.S. PATENT DOCUMENTS

| | | | | |
|---|---|---|---|---|
| 5,345,590 A | * | 9/1994 | Ault et al. ....................... 709/1 |
| 5,659,756 A | * | 8/1997 | Hefferon et al. ............. 710/200 |
| 5,805,790 A | * | 9/1998 | Nota et al. ..................... 714/10 |
| 5,872,907 A | * | 2/1999 | Griess et al. .................. 714/17 |
| 6,256,748 B1 | * | 7/2001 | Pinson ........................... 714/6 |
| 6,374,363 B1 | * | 4/2002 | Wu et al. ....................... 714/6 |
| 6,381,682 B2 | * | 4/2002 | Noel et al. ................... 711/153 |
| 6,421,679 B1 | * | 7/2002 | Chang et al. ............ 707/103 R |

\* cited by examiner

*Primary Examiner*—Scott Baderman
*Assistant Examiner*—Emerson Puente
(74) *Attorney, Agent, or Firm*—Duke W. Yee; Mark E. McBurney; Lisa L. B. Yociss (57) ABSTRACT

A method, system, and apparatus for isolating fatal data fetch errors to a single partition within a logically partitioned data processing system. In one embodiment, the logically partitioned data processing system includes a plurality of operating systems and a plurality of processors is provided. Each of the operating systems is assigned to a separate one of a plurality of logical partitions. Each of the processors is assigned to one of the plurality of logical partitions. The logically partitioned data processing system also includes a hypervisor for creating and maintaining separation of the plurality of logical partitions. The hypervisor contains services and functions accessed by each of the logical partitions and, to prevent fatal data fetch errors in one partition from effecting other partitions within the logically partitioned data processing system, the hypervisor includes a plurality of data structure areas. Fatal data fetch errors occurring in one of the plurality of data structure areas results in rebooting data processing system components associated with only a single effected logical partition of the plurality of logical partitions within the logically partitioned data processing system.

10 Claims, 6 Drawing Sheets

RECOVERY FROM DATA FETCH ERRORS IN HYPERVISOR CODE

CROSS REFERENCE TO RELATED APPLICATIONS

The present application is related to co-pending U.S. patent application Ser. No. 09/589,660 entitled "RECOVERY FROM INSTRUCTION FETCH ERRORS IN HYPERVISOR CODE" filed Jun. 8, 2000. The content of the above-mentioned commonly assigned, co-pending U.S. patent application is hereby incorporated herein by reference for all purposes.

BACKGROUND OF THE INVENTION

1. Technical Field

The present invention relates generally to the field of computer architecture and, more specifically, to methods and systems for managing resources among multiple operating system images within a logically partitioned data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

One means for separating the partitions is managed by a firmware component; such as, for example the hypervisor within an RS/6000 platform, a product of International Business Machines Corporation of Armonk, N.Y. Hardware errors that are fatal to this firmware component become fatal for the entire platform, thus, bringing down the entire system. One major hardware error that may affect the hypervisor is a data fetch unrecoverable memory error (DfetchUE). The Risc system 6000 memory, within the RS/6000, is single bit error correction code protected, that is, hardware is able to correct any single bit error by special redundancy codes. However, currently, multi-bit errors cannot be corrected, but may only be detected. Multi-bit errors, while rare, occur due to a variety of conditions. Therefore, a method, system, and apparatus for recovering and isolating errors affecting the hypervisor is desirable.

SUMMARY OF THE INVENTION

The present invention provides a method, system, and apparatus for isolating fatal data fetch errors to a single partition within a logically partitioned data processing system. In one embodiment, the logically partitioned data processing system includes a plurality of operating systems and a plurality of processors. Each of the operating systems is assigned to a separate one of a plurality of logical partitions. Each of the processors is assigned to one of the plurality of logical partitions. The logically partitioned data processing system also includes a hypervisor for creating and maintaining separation of the plurality of logical partitions. The hypervisor contains services and functions accessed by each of the logical partitions, and to prevent fatal data fetch errors in one partition from effecting other partitions within the logically partitioned data processing system, the hypervisor includes a plurality of data structure areas. Fatal data fetch errors occurring in one of the plurality of data structure areas results in rebooting data processing system components associated with only a single effected logical partition of the plurality of logical partitions within the logically partitioned data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
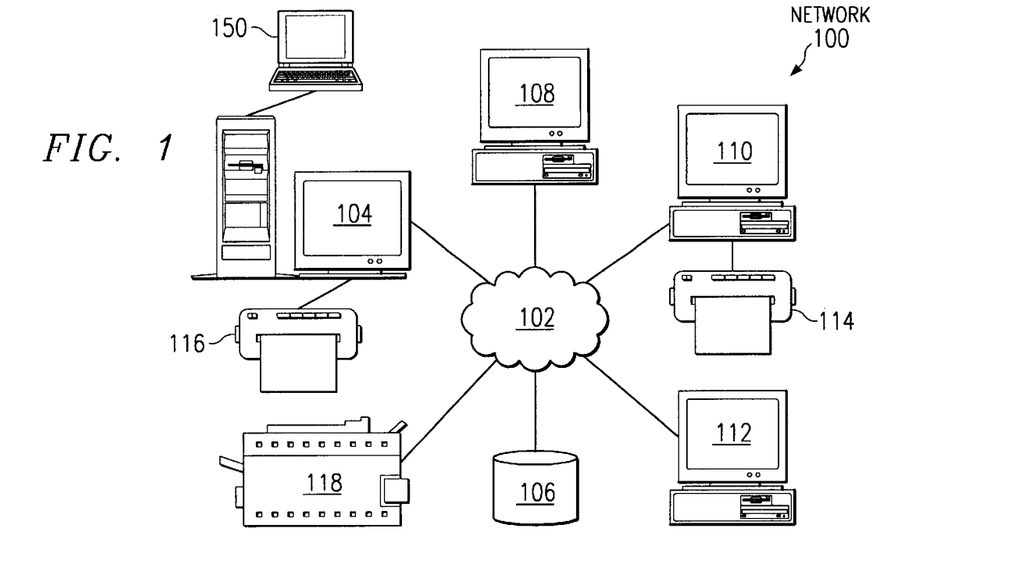
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112, are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
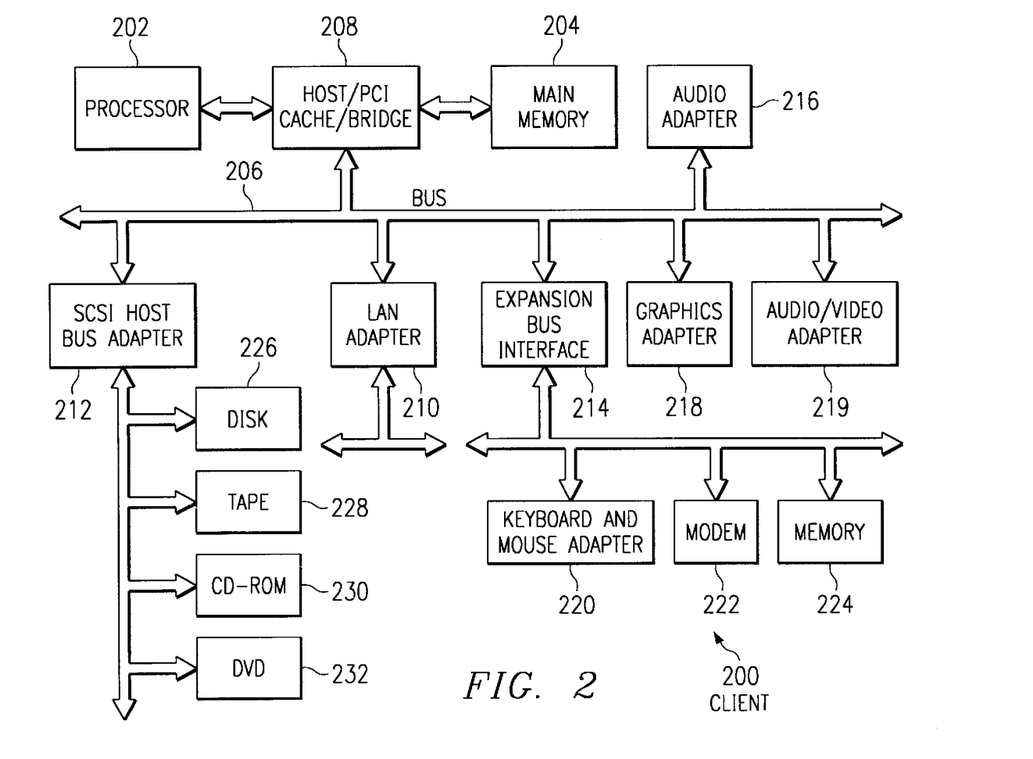
FIG. 2, a block diagram of a data processing system in accordance with the present invention is illustrated.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
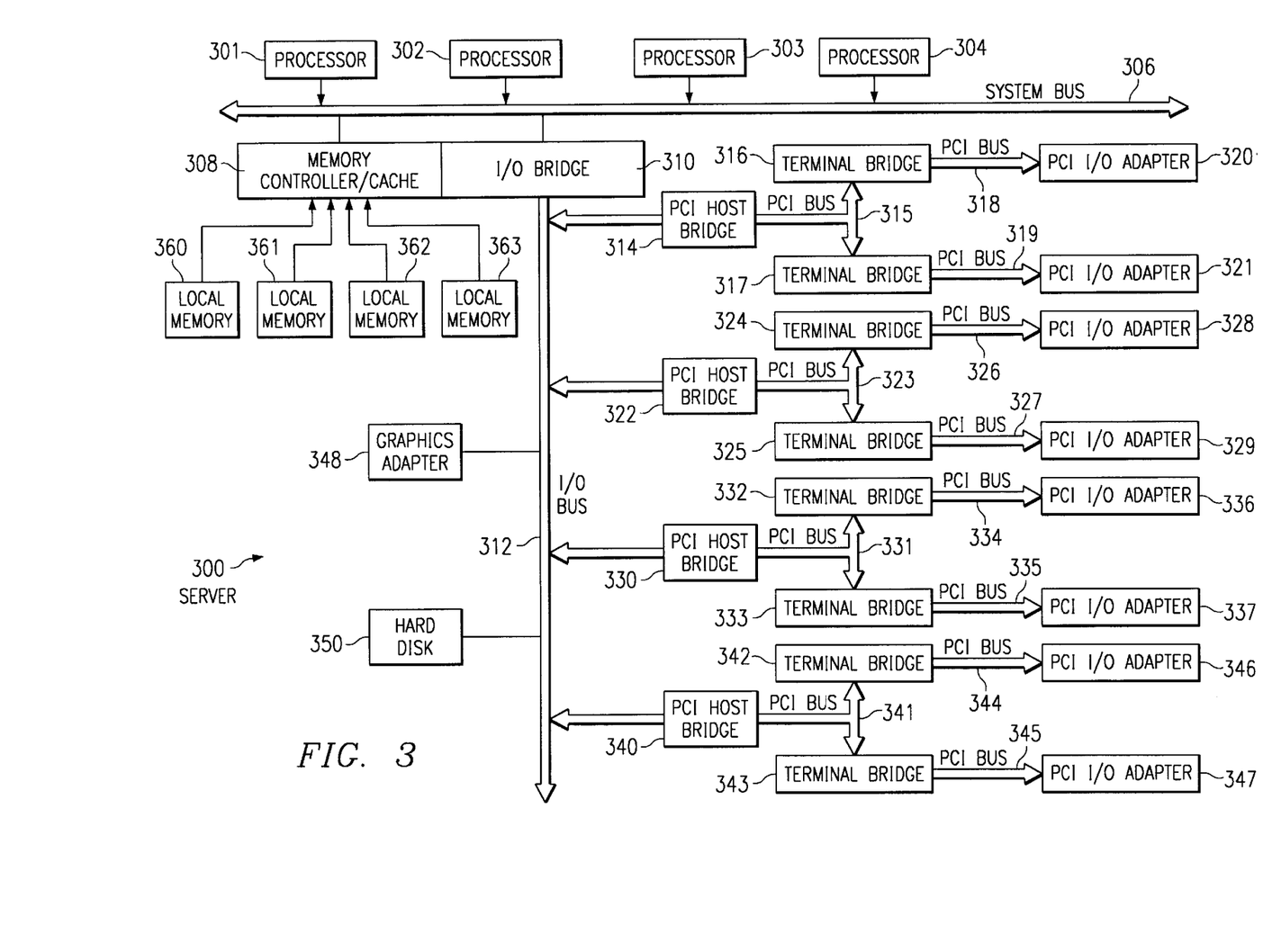
FIG. 3 depicts a block diagram of a data processing system, which may be implemented as a logically partitioned server, in accordance with the present invention.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows™ operating system may be operating within logical partition P3. Windows 2000 is a product and trademark of Microsoft Corporation of Redmond, Wash.

Peripheral component interconnect (PCI) Host bridge 314 connected to I/O bus 312 provides an interface to PCI local bus 315. A number of Terminal Bridges 316–317 may be connected to PCI bus 315. Typical PCI bus implementations will support four Terminal Bridges for providing expansion slots or add-in connectors. Each of Terminal Bridges 316–317 is connected to a PCI I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343 which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
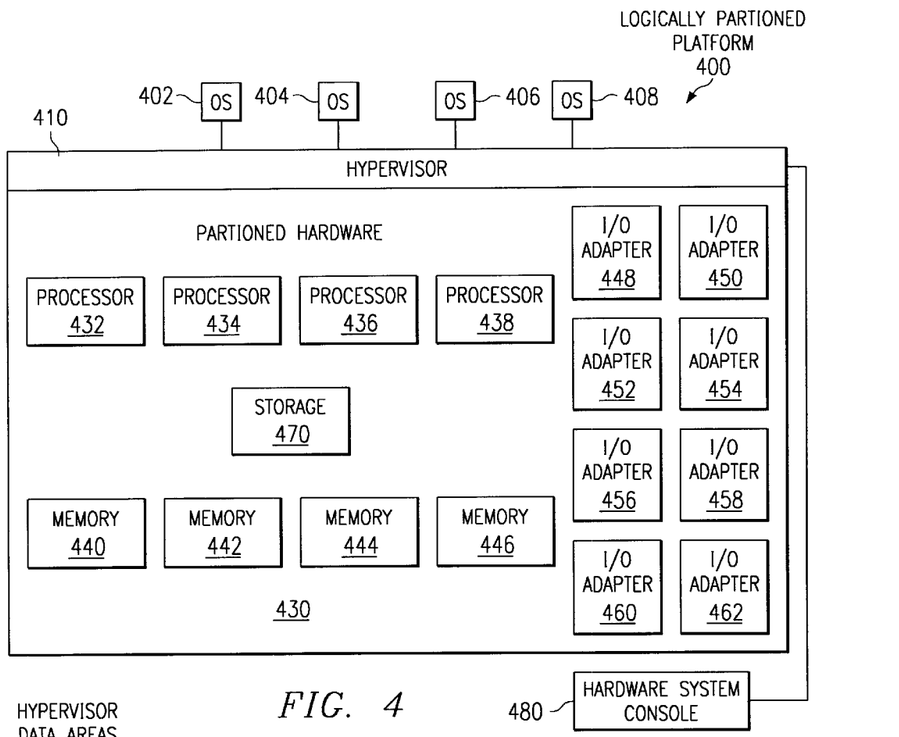
FIG. 4 depicts a block diagram of a logically partitioned platform in which the present invention may be implemented.

With reference now to FIG. 4, a block diagram of an exemplary logically partitioned platform is depicted in which the present invention may be implemented. The hardware in logically partitioned platform 500 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Hypervisor 410, implemented as firmware, creates and enforces the partitioning of logically partitioned platform 400. Firmware is software stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Hypervisor 410 provides a secure direct memory access (DMA) window, per IOA, such as, for example, IOA 328 in FIG. 3, on a shared I/O bus, such as, for example, I/O bus 312 in FIG. 3, into the memory resources allocated to its associated OS image, such as, for example, OS image 402 in FIG. 4. The secure DMA window provides access from an IOA to memory which is allocated to the same partition as the IOA, while preventing the IOA from getting access to the memory allocated to a different partition.

In one embodiment, as implemented within an RS/6000 Platform Architecture, the hypervisor makes use of two existing hardware mechanisms. These hardware mechanisms are called the translation control entry (TCE) facility and the DMA range register facility Bridge. In one embodiment, the TCE facility is implemented in the PCI Host Bridge, such as PCI Host Bridges 314, 322, 330, and 340 in FIG. 3, and the range register facility is implemented in the Terminal Bridge, such as Terminal Bridges 316–317, 324–325, 332–333, and 342–343.

The TCE facility (not shown) is a facility for the I/O which is analogous to the virtual memory address translation facility provided by most processors today. That is, the TCE facility provides a mechanism to translate a contiguous address space on the I/O bus to a different and possibly non-contiguous address space in memory. It does this in a manner similar to the processor's translation mechanism, and thus breaks the address space of the memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an I/O operation starts on the bus, the TCE facility accesses the entry for that page in the TCE table, and uses the data in that entry as the most significant bits of the address to access memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in memory is addressed, and the address bits taken from the I/O bus determines the address within the page.

The bus address ranges that the IOAs are allowed to place onto the I/O bus are limited by the range register facility. The range register facility contains a number of registers that hold addresses that are compared to what the IOA is trying to access. If the comparison shows that the IOA is trying to access outside of the range of addresses that were programmed into the range registers by the firmware, then the bridge will not respond to the IOA, effectively blocking the IOA from accessing addresses that it is not permitted to access. In this embodiment, these two hardware mechanisms are placed under the control of the hypervisor.

When platform 400 is initialized, a disjoint range of I/O bus DMA addresses is assigned to each of IOAs 448–462 for the exclusive use of the respective one of IOAs 448–462 by hypervisor 410. Hypervisor 410 then configures the Terminal Bridge range register (not shown) facility to enforce this exclusive use. Hypervisor 410 then communicates this allocation to the owning one of OS images 402–408. Hypervisor also initializes all entries in a particular IOA's associated section of the TCE table to point to a reserved page per image that is owned by the OS image that is allocated that IOA, such that unauthorized accesses to memory by an IOA will not create an error that could affect one of the other OS images 402–408.

When an owning one of OS images 402–408 requests to map some of its memory for a DMA operation, it makes a call to the hypervisor 410 including parameters indicating the IOA, the memory address range, and the associated I/O bus DMA address range to be mapped. The hypervisor 410 checks that the IOA and the memory address range are allocated to the owning one of OS images 402–408. The hypervisor 410 also checks that the I/O bus DMA range is within the range allocated to the IOA. If these checks are passed, the hypervisor 410 performs the requested TCE mapping. If these checks are not passed, he hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a computer 480, known as a hardware system console.

Hardware system console 480 is connected directly to logically partitioned platform 400, as illustrated in FIG. 4, or may be connected to logically partitioned platform through a network, such as, for example, network 102 in FIG. 1. Hardware system console 480 may be, for example, a desktop or laptop computer, and may be implemented as data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

Figure 5:
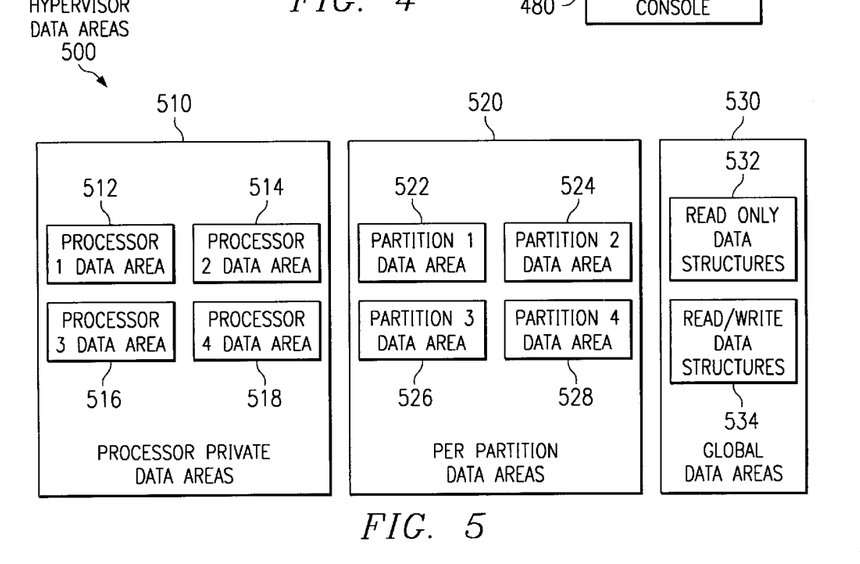
FIG. 5 depicts a block diagram illustrating an exemplary structure of the data areas within a hypervisor in accordance with the present invention.

With reference now to FIG. 5, a block diagram illustrating an exemplary structure of the data areas within a hypervisor, such as, for example, hypervisor 410 in FIG. 4, is depicted in accordance with the present invention. To isolate data fetch unrecoverable memory errors to the effected processor and its associated partition and to prevent these errors from effecting the other platform partitions or from becoming fatal to the entire platform, the hypervisor data areas 500 are divided into three different areas: processor private data areas 510, per partition data areas 520, and global data areas 530. Data fetch unrecoverable memory errors may occur due to an attempt to retrieve data from a memory block that is unreadable. Thus, while these unrecoverable (or fatal) memory errors may be fatal (requiring a reboot, thus losing unstored information) to the affected processor, these errors are not necessarily fatal to the entire platform using the data structures as described below. If a data fetch unrecoverable memory error is isolated to a particular partition, then only those hardware and software components within the effected partition need to be rebooted, while other software applications and operating systems in different partitions may continue to function properly.

Processor private data areas 510 consists, in this example, of four data areas 512–518, one for each of four processors within the logically partitioned data processing system. Each processor has a processor private data area 512–518, whose loss only affects the operation of that particular processor. When a data fetch unrecoverable memory error (sometimes referred to as DfetchUE) is received by a processor, machine check firmware running on the effected processor writes a non-volatile random access memory (NV-RAM) log record to be detected by a subsequent event scan by the affected partition.

Event Scan is a periodic task run by each operational processor in an RS/6000 partition. This task makes a request of the firmware to report on the "health" of the hardware. One of the components of the firmware's "platform health report card" is any errors that have been "logged" in the NV-RAM error log. Errors are logged by asynchronous mechanisms, such as support processors, or in this case, a processor that cannot synchronously report the detection of an error to its own operating system. The reason that the processor cannot make a synchronous report is that the processor private data area which has been corrupted, contains the very information needed to find the OS and communicate with it. The NV-RAM error logs are also checked on a subsequent software reboot. The reason for this is to report to the system operator information needed to isolate the cause of a system crash and reboot. The presence of an NV-RAM log record and its contents indicates that the hardware had a problem and a repair action may need to be scheduled.

Once the machine check firmware has written the NV-RAM log record, the machine check firmware either stops the program execution within the effected processor or signals a system reset interrupt to the other partition processors followed by the execution of the OS's reboot policy. A sophisticated OS reports to the firmware that it is capable of continuing without one of its processors. In this case all that may be needed is to save the effected processor's application state to be later picked up asynchronously by one of the other partition processors. Such processing requires a fairly sophisticated OS. Simpler OS's (which have not reported to the firmware that they can handle this condition) get the system reset signal to start their reboot sequence.

Considering now the situation in which the machine check firmware stops program execution, in a multiprocessor partition (a partition which utilizes more than one processor within the data processing system), another processor allocated to that partition will execute event scan and find the processor which has ceased to perform due to the data fetch unrecoverable memory error. The OS image in the partition owning the effected processor then handles the fatal error with its log and reboot policy. In a single processor per partition situation with surveillance active, the surveillance support processor discovers the problem and performs the partition log and reboot policy. The support processor may also check on the error stop state of the single processor partitions and attempt a reset or the machine check firmware may wait for the operator to signal a partition reset.

The per partition data areas 520 consists of a plurality of data areas 522–528 corresponding to each partition within the logically partitioned data processing system. In the depicted example, there are four partitions, each with its own partition data area 522–528. Each partition data area 522–528 consists primarily of the partition's page frame table (PFT), the logical address translation tables, and resource maps. To modify any of these facilities requires the modifying processor to take a lock.

A "lock" is a software construct that guarantees one processor exclusive access to the "locked" data structure until the processor releases the lock. There are many forms of this construct. It is equivalent to the workers in an office "checking out" a file to be updated and then checking it back in when complete. This allows multiple people in the office example or multiple processors in a computer example to share updating responsibility for a particular piece of data without their updates conflicting.

In one embodiment, each PFT entry has two lock bits, other lock structures have their own locks. Should a processor experience a fatal data fetch error holding one of these locks, one of the other processors allocated to the same partition executes an event scan, discovers the error log from the processor that experienced the fatal error, and reports this to the owning OS as a fatal situation. The owning OS executes its logging and reboot policy. Alternatively, another processor within the partition may attempt to acquire the lock, time out, and declare a hardware error back to its calling routine. This too results in the owning OS logging and rebooting. It should be noted that there is no requirement that a determination as to which of the processors within the partition owns the lock, since the condition is partition fatal, and all partition processors are recovered by the partition reboot.

If there is only one processor in a partition, then the reboot is done immediately after the NV-RAM log record is written. Without another unaffected processor, the OS in its present state cannot continue. After reboot, the OS reads the NV-RAM log to notify the operator of the cause of the reboot.

Global data structures within global data area 530 are of two forms: read only data structures 532 and read/write data structures 534. A global data structure is a data structure that may be accessed by any processor or device within the logically partitioned data processing system regardless of the partition to which the requesting device belongs. Prior to writing to a writeable global data structure 534 (outside of the global lock structure), the writing processor takes a lock associated with the specific structure. The lock value identifies both the processor using the data structure 534 and the branch table index of the recovery routine (for example, fatal non-recoverable) that must be executed when the lock owning processor experiences a fatal event.

The global lock structure is the locking construct that protects the global data structure. That is it contains the memory that is automatically set to the processor number of the processor running the program that is currently modifying the global data structure. The global lock structure also contains any other stored variables that are needed in the recovery process of the global data structure. In this case, one of the pieces of recovery information is a pointer to the global data structure dependent recovery routine. If indeed the global lock structure itself is corrupted, then there is little that can be done to recover the global data area and a total platform reboot is needed. Fortunately, the global lock structure is small so the probability that it is corrupted by any given error is likewise very small.

If another requesting processor requests the writeable global data structure 534 locked by the writing processor and times out (i.e. waits longer than a platform specific predefined amount of time) on its request, then the requesting processor scans a list of failed processors (i.e. processors that have experienced a fatal error). If the processor holding a lock on the writeable global data structure 534 is present on the list, the requesting processor takes responsibility for running the specified lock recovery routine. If the lock recovery routine returns a result indicating that the data corruption in writeable global data structure 534 has been mended, then the requesting processor may then continue with its requested operation. If, on the other hand, the lock recovery routine returns an indication that data area 534 is permanently corrupted, then the hypervisor returns a hardware error to the requesting processor.

If after scanning a list of failed processors, the requesting processor determines that the holding processor is not marked as failed, the requesting processor waits several more time out periods and then declares the holding processor failed. The requesting processor then writes an NV-RAM log to that effect and attempts to run the lock recovery routine as outlined above.

In one embodiment of the present invention, two copies of all data within each processor's private data area are maintained. Thus, prior to writing the NV-RAM log, if a processor attempts to read data and receives a fatal data fetch error, the processor attempts to read (fetch) the data from the alternate copy of the data. Only after such attempt at reading the alternate copy has failed does the processor write an error indication to the NV-RAM log. If an attempt to update data in the processor's private data area fails during the write process, the processor copies the data from the alternate copy, as it existed prior to the write attempt, into the primary copy and starts over as if the update had never been performed. Only should the attempt to write (or update) fail after this copying step does the processor then write an error indication to the NV-RAM log, thus requiring a reboot of the partition.

With reference now to FIGS. 6 and 7A–7D, flowcharts illustrating exemplary processes for recording and dealing with fatal data fetch errors in situations in which the effected processor cannot be trusted to signal the other processors within its partition are depicted in accordance with the present invention. In these embodiments, the effected processor simply stops after logging an error. The condition is noticed by an asynchronous agent, such as, for example, another partition processor or a support processor, and the partition rebooted. Such processes are performed if the attempt at data recovery is unsuccessful or if the platform does not incorporate the embodiment for data recovery discussed above.

Figure 6:
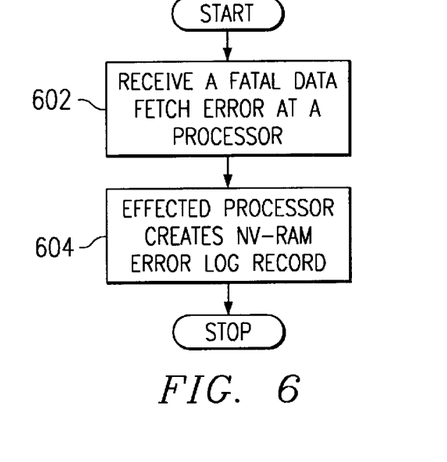
FIGS. 6 and 7A–7D depict flowcharts illustrating exemplary processes for recording and dealing with fatal data fetch errors in situations in which the effected processor cannot be trusted to signal the other processors within its partition in accordance with the present invention.

Referring now to FIG. 6, a flowchart illustrating recording a fatal data fetch error is depicted in accordance with the present invention. A processor receives a fatal data fetch error (step 602). The effected processor then creates an NV-RAM error log record of the fatal data fetch error (step 604) and stops performing. Any one of the procedures depicted in FIGS. 7A–7D discussed below may then be performed to execute the reboot policy of the partition to which the processor receiving the fatal data fetch error is allocated, thus preventing the fatal data fetch error from affecting hardware or software components within other partitions within the data processing system.

Figure 7A:
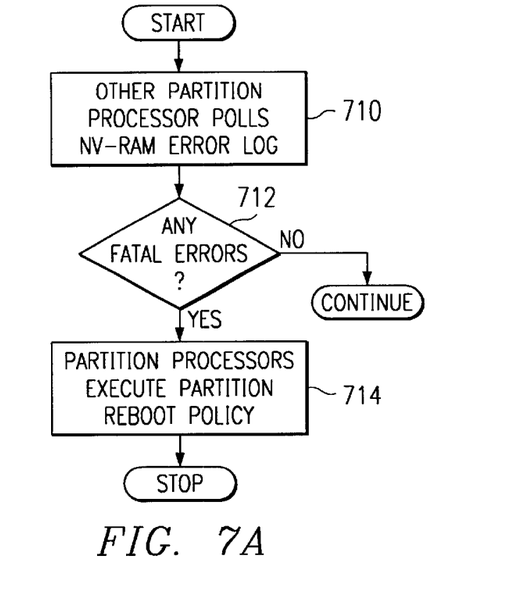

Referring now to FIG. 7A, a flowchart illustrating an embodiment of an exemplary process for handling the error in which another platform processor is utilized to notice the error and affect a reboot is depicted in accordance with the present invention. In this embodiment, another partition processor, other than the processor effected by the fatal data fetch error, polls the NV-RAM error log (step 710). The other partition processor then determines whether the NV-RAM error log contains any reported fatal errors (step 712). If there are not reported fatal errors, then the other partition processor continues with other processes. If there are fatal data fetch errors recorded in the NV-RAM error log, then the other partition processor executes the partition's reboot policy (step 714).

Figure 7B:
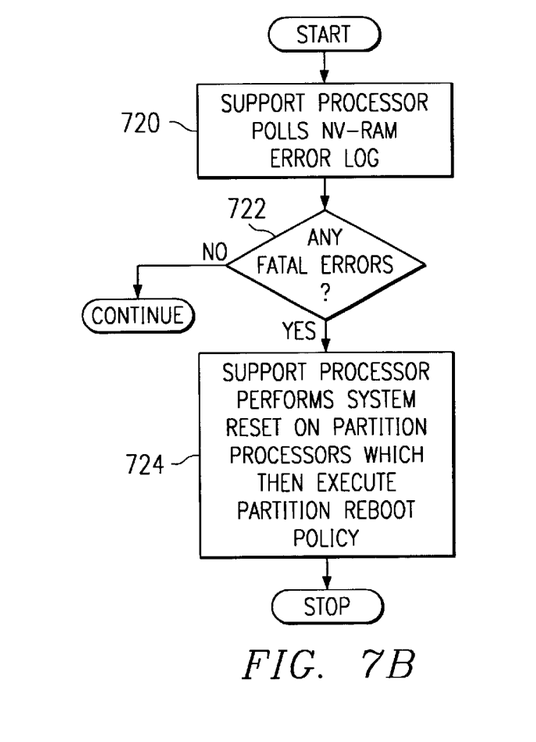

Referring now to FIG. 7B, a flowchart illustrating an exemplary embodiment of a process in which a support processor us utilized for handling the fatal data fetch error is depicted in accordance with the present invention. The support processor polls the NV-RAM error log (step 720) and determines whether the NV-RAM error log contains any reported fatal errors (step 722). If the NV-RAM error log does not contain any reported fatal errors, then the support processor continues with other processes. If the NV-RAM error log does contain reported fatal errors, then the support processor performs a system reset on the partition processors within the partition to which the effected processor is allocated (step 724). These other partition processors then execute the partition reboot policy.

Figure 7C:
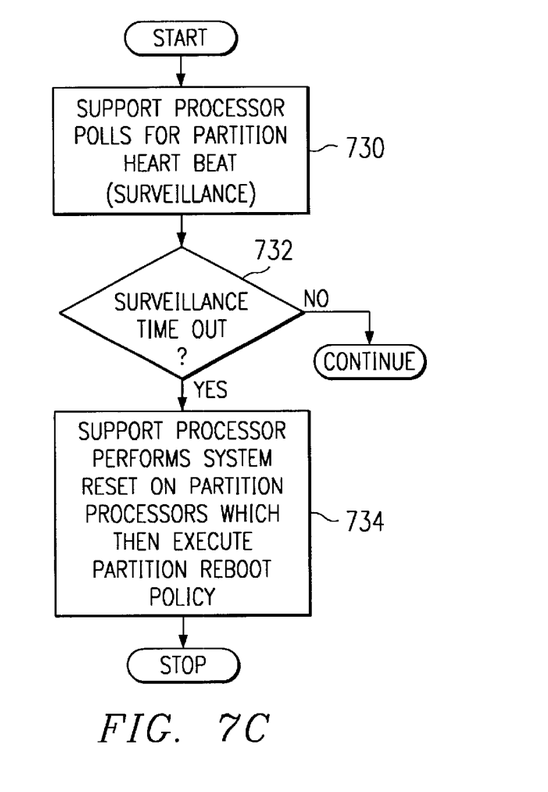

Referring now to FIG. 7C, a flowchart illustrating an alternative exemplary embodiment of a process, wherein a support processor is utilized to handle the fatal data fetch error is depicted in accordance with the present invention. In this embodiment, the support processor polls for a partition "heart beat" (step 730). That is, the support processor performs surveillance upon the processors within the partition to determine activity. The support processor then determines whether the surveillance has timed out (step 732). A time out occurs when, after a platform specified amount of time, no response is received from the processors under surveillance. If the surveillance does not time out, then the support processor continues with other processes. If the surveillance does time out, then the support processor performs a system reset on the partition processors allocated to the partition to which the processor effected by the data fetch error is allocated (step 734). These other partition processors then executes the partition reboot policy.

Figure 7D:
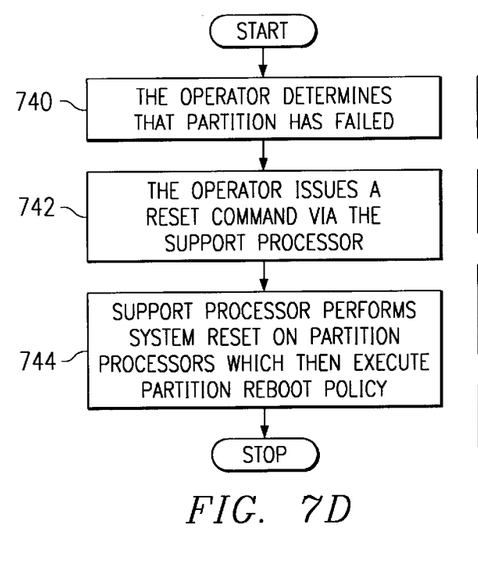

Referring now to FIG. 7D, a flowchart illustrating an embodiment of an exemplary process for dealing with unrecoverable data fetch errors in which human intervention initiates a reboot procedure within the effected partition is depicted in accordance with the present invention. In this embodiment, a human operator determines that a partition has failed (step 740). The operator may make this determination based on accessing the NV-RAM error log record or upon noticing that programs executing within the partition have ceased to function. The operator then issues a reset command via a support processor (step 742). The support processor performs a system reset on the partition processors allocated to the partition to which the processor effected by the data fetch error is allocated, which then execute the partition's reboot policy (step 744).

It should be noted that any one of the processes depicted in FIGS. 7A–7D, once the fatal data fetch error has been logged as in FIG. 6, prevents a data fetch error occurring within a particular processor's private data area from effecting the correct operation of other partitions within the data processing system.

Figure 8:
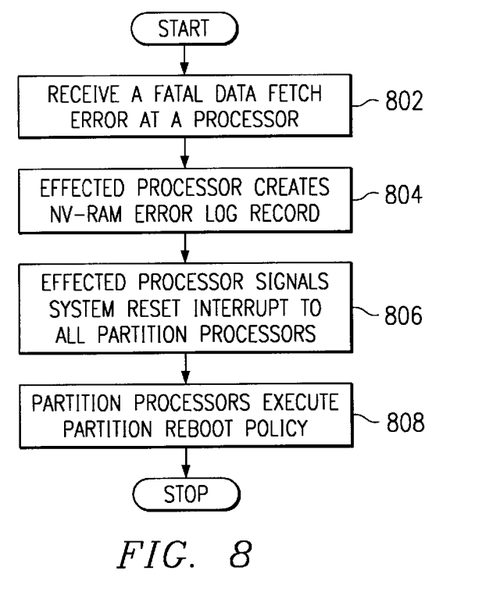
FIG. 8 depicts a flowchart illustrating another embodiment of an exemplary process for preventing a data fetch error occurring within a particular processor's private data error from effecting the correct operation of other partitions within the data processing system in accordance with the present invention.

With reference now to FIG. 8, a flowchart illustrating another embodiment of an exemplary process for preventing a data fetch error occurring within a particular processor's private data error from effecting the correct operation of other partitions within the data processing system is depicted in accordance with the present invention. In this embodiment, the effected processor synchronously signals the other partition processors. To begin, a processor receives a fatal data fetch error (step 802). The effected processor creates an NV-RAM error log record indicating the occurrence of the fatal data fetch error (step 804). The effected processor then signals a system reset interrupt to all the processors within the partition to which the effected processor is allocated (step 806). The other partition processors then execute the partition's reboot policy (step 808). Thus, the hardware and software within the effected partition must be rebooted, but hardware and software allocated to other partition's within the data processing system remain unaffected by the fatal data fetch error.

Figure 9:
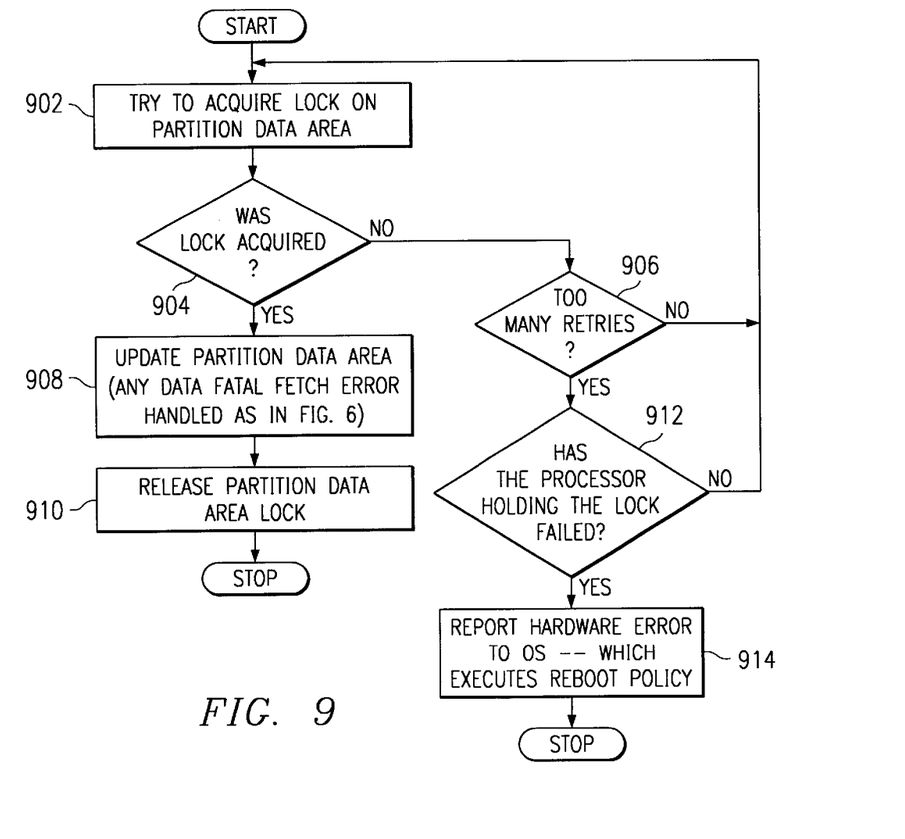
FIG. 9 depicts a flowchart illustrating an exemplary process for preventing fatal data fetch errors occurring within a partition's data area from effecting other partitions within a logically partitioned data processing system in accordance with the present invention.

With reference now to FIG. 9, a flowchart illustrating an exemplary process for preventing fatal data fetch errors occurring within a partition's data area from effecting other partitions within a logically partitioned data processing system is depicted in accordance with the present invention. To begin, a processor attempts to acquire a lock on a partition data area (step 902). The processor then determines whether a lock was acquired (step 904). If a lock was not acquired, then the processor determines whether too many retries have been attempted in acquiring the lock (step 906). If the number of retries has not reached a maximum, then the processor again attempts to acquire the lock on the partition data area (step 902).

If the number of retries has exceeded a implementation dependent maximum number of retries, then the processor determines whether the processor holding the lock has failed (step 912). If the process holding the lock has not failed, then the processor again attempts to acquire the lock on the partition data area (step 902). If the processor holding the lock has failed, then the processor attempting to acquire the lock reports a hardware error to the owning operating system, which then executes the operating system's reboot policy (step 914).

If the lock was acquired, then the processor updates the partition data area (step 908). Any data fatal fetch errors are handled as in FIG. 6. The processor then releases the partition data area lock (step 910).

Figure 10:
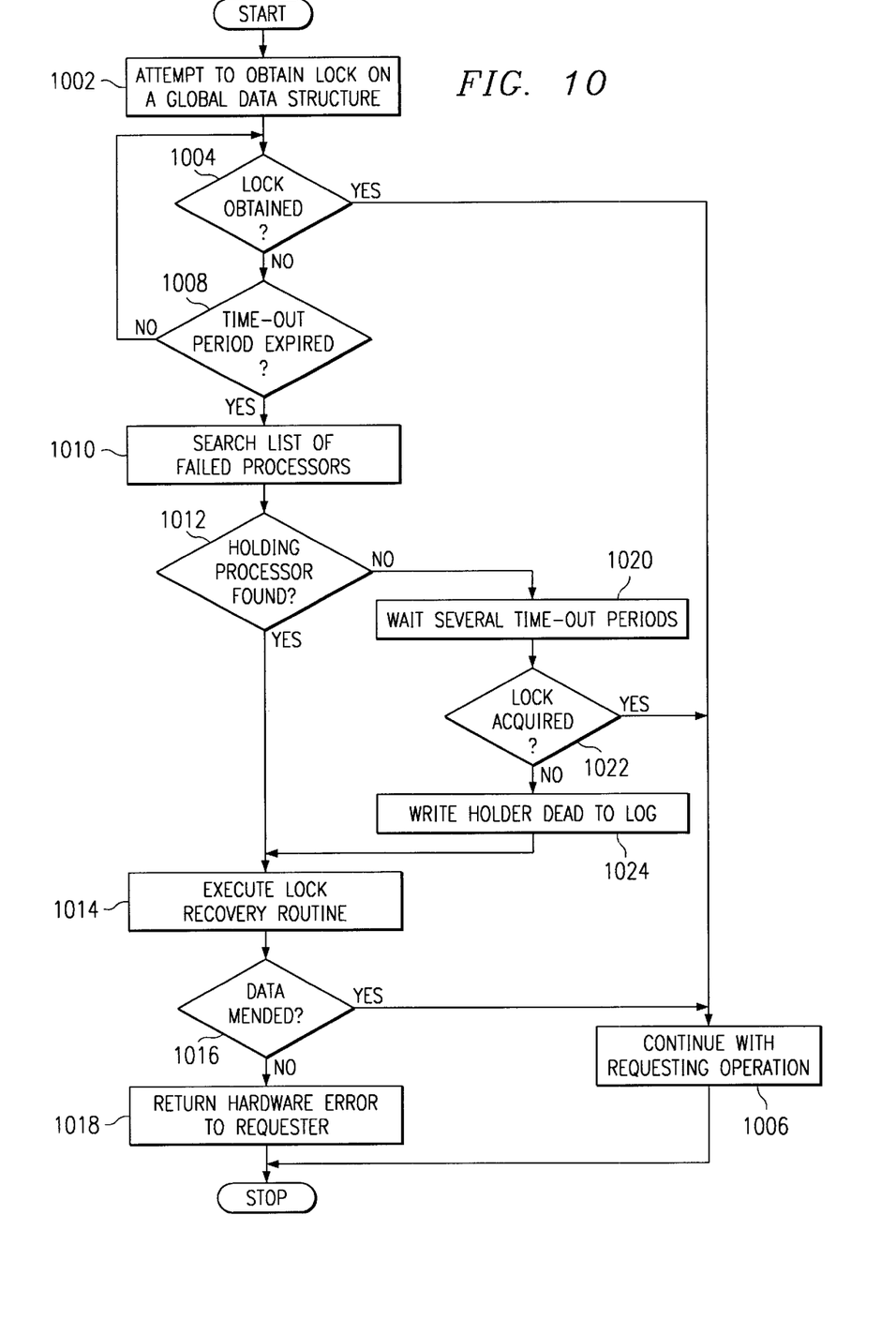
FIG. 10 depicts a flowchart illustrating an exemplary process for preventing data fetch errors for one processor in one partition, resulting from an attempted operation in a global data area, from effecting the processes and operation of other partitions in accordance with the present invention.

With reference now to FIG. 10, a flowchart illustrating an exemplary process for preventing data fetch errors for one processor in one partition, resulting from an attempted operation in a global data area, from effecting the processes and operation of other partitions is depicted in accordance with the present invention. To begin, a processor attempts to obtain a lock on a global data structure (step 1002). Next, it is determined whether the lock was obtained (step 1004). If the lock was obtained, then continue with the requested operation (step 1006). If the lock was not obtained because another processor has previously locked the data structure, then determine whether a time-out period has expired (step 1008).

If a time-out period has not expired, then continue to attempt to obtain the lock (step 1004) until the time-out period expires. If the time-out period has expired, then search a list of failed processors (step 1010) and determine whether the processor holding the lock on the data structure is found in the list (step 1012). If the holding processor is found on the list, then execute the lock recovery routine previously specified by the holding processor (step 1014). Next, the requesting processor receives information from the lock recovery routine regarding the data structure requested and determines whether the lock recover routine has mended the data (step 1016).

If the lock recovery routine has mended the data, then the requesting processor continues with its requested operation (step 1006). If the data has not been mended and is permanently corrupted, the hypervisor returns a hardware error to the requesting processor, which then instructs the operating system for the partition, in which the holding processor is assigned, to execute its logging and reboot policy (step 1018).

If the holding processor is not found in the list of failed processors, then the requesting processor waits for several time-out periods (step 1020) and determines whether the lock may now be acquired (step 1022). The number of time-out periods waited is not crucial and may be implementation dependent. If the lock has been acquired, then continue with the requested operation on the requested data (step 1006). If the lock is not acquired, then write holding processor as dead to a log (step 1024), attempt to execute the lock recovery routine (step 1014) and continue as before from step 1016.

Although the present invention has been described primarily in terms of a specific firmware component called the hypervisor, one skilled in the art will recognize that the present invention may be applied to other critical software components in a multi-programming environment as well. It is also important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, as a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logically partitioned data processing system; comprising:
   a plurality of processors, each of which assigned to one of a plurality of partitions; and
   a plurality of private data areas, each of which is assigned to one of the plurality of processors and each of the plurality of private data areas includes a primary copy of data and an alternate copy of data; wherein
      each of the plurality of processors is configured, during data fetch operations, to attempt to retrieve data from the primary copy of the data and, responsive to a failure to retrieve the data from the primary copy, attempting to retrieve the data from the alternate copy of the data; and
      each of the plurality of processors is configured, responsive to a failure of a write operation to the primary copy of data, to copy data from the alternate copy of the data into the primary copy of the data and re-attempt the write operation.

2. The logically partitioned data processing system as recited in claim 1, wherein each of the plurality of processors is configured, responsive to a fatal data fetch error from both the primary copy and the alternate copy, to write an error indication to a log file.

3. The logically partitioned data processing system as recited in claim 2, wherein each of the plurality of processors is configured to search the log file and, responsive to a determination that another processor allocated to a same partition, has recorded a fatal data fetch error, initiating a reboot policy in the same partition.

4. The logically partitioned data processing system as recited in claim 2, further comprising:
   a support processor, wherein
      the support processor is configured to monitor the log file and, responsive to an indication that a processor has recorded a fatal data fetch error in the log file, notifying other processors, allocated to a same partition as the processor reporting the fatal data fetch error, of the error, whereby the other processors allocated to the same partition initiate the same partition's reboot policy.

5. The logically partitioned data processing system as recited in claim 2, further comprising:
   a support processor, wherein
      the support processor performs surveillance on each of the plurality of partitions and, responsive to a determination that a processor within one of the plurality of partitions does not respond after a time out period, performing a system reset on the other processors within the partition to which the non-responding processor is allocated.

6. The logically partitioned data processing system as recited in claim 2, further comprising:
   a support processor, wherein
      the support processor, responsive to receipt of a user initiated reset command, performs a reset on partition processors allocated to a same partition as that to which the processor receiving the fatal data fetch error is allocated.

7. A method of preventing a data fetch error occurring within one partition from affecting the operation of other partitions within a logically partitioned data processing system, the method comprising:

receiving, at a processor, a data fetch error;

creating an error log file indicating the receipt of the data fetch error;

initiating a reboot policy for the one partition to which the processor receiving the data fetch error is allocated; and wherein the initiating a reboot policy step comprises:
other processors, allocated to one partition to which the processor receiving the data fetch error is allocated, polling the error log file; and
responsive to determining that a data fetch error has been recorded, other processors executing the reboot policy.

8. A computer program product for preventing a data fetch error occurring within one partition from affecting the operation of other partitions within a logically partitioned data processing system, the product comprising:

instruction means for receiving, by a processor, a data fetch error;

instruction means for creating an error log file indicating the receipt of the data fetch error;

instruction means for initiating a reboot policy for the one partition to which the processor receiving the data fetch error is allocated; and wherein the instruction means for initiating a reboot policy further comprises:
instruction means for polling the error log file by other processors allocated to one partition to which the processor receiving the data fetch error is allocated; and
instruction means responsive to determining that a data fetch error has been recorded, for executing the reboot policy by other processors.

9. A method of preventing a data fetch error occurring within one partition from affecting the operation of other partitions within a logically partitioned data processing system, the method comprising:

receiving, at a processor, a data fetch error;

creating an error log file indicating the receipt of the data fetch error;

initiating a reboot policy for the one partition to which the processor receiving the data fetch error is allocated; and wherein the initiating the reboot policy comprises receipt of a user command to initiate the reboot policy.

10. A method of preventing a data fetch error occurring within one partition from affecting the operation of other partitions within a logically partitioned data processing system, the method comprising:

receiving, at a processor, a data fetch error;

creating an error log file indicating the receipt of the data fetch error;

initiating a reboot policy for the one partition to which the processor receiving the data fetch error is allocated; and wherein the initiating the reboot policy comprises:
the processor signaling a system reset to other processors allocated to a same partition; and
initiation of the reboot policy by the other processors.

* * * * *

UNITED STATES PATENT AND TRADEMARK OFFICE
CERTIFICATE OF CORRECTION

PATENT NO.        : 6,658,591 B1
APPLICATION NO.   : 09/589797
DATED             : December 2, 2003
INVENTOR(S)       : Arndt It is certified that error appears in the above-identified patent and that said Letters Patent is hereby corrected as shown below:

Col. 5, line 2: after "memories", delete "360-364" and insert --360-363--.

Signed and Sealed this

Twenty-eighth Day of November, 2006

JON W. DUDAS
*Director of the United States Patent and Trademark Office*